No. 674,702. Patented May 21, 1901.
J. C. LAMBERT.
TOOL HANDLE.
(Application filed Sept. 21, 1900.)
(No Model.)
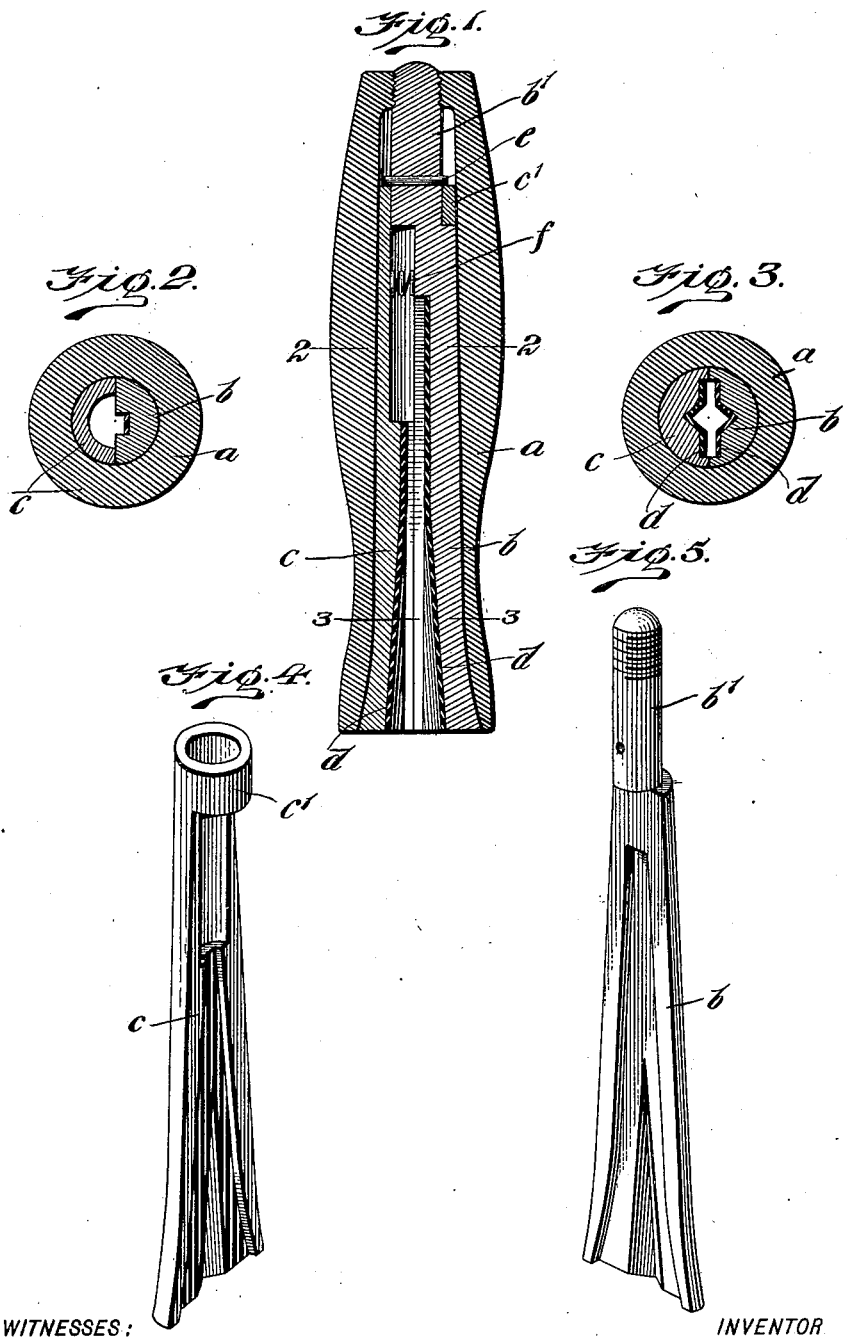
WITNESSES:
INVENTOR
John C. Lambert.
BY
ATTORNEYS
THE NORRIS PETERS CO., PHOTO-LITHO., WASHINGTON, D. C.

UNITED STATES PATENT OFFICE.

JOHN CALVIN LAMBERT, OF TONICA, ILLINOIS.

TOOL-HANDLE.

SPECIFICATION forming part of Letters Patent No. 674,702, dated May 21, 1901.

Application filed September 21, 1900. Serial No. 30,672. (No model.)

*To all whom it may concern:*

Be it known that I, JOHN CALVIN LAMBERT, a citizen of the United States, and a resident of Tonica, in the county of Lasalle and State of Illinois, have invented a new and Improved Tool-Handle, of which the following is a full, clear, and exact description.

The purpose of this invention is to provide a holder for hand-operated tools to which the tools may be quickly applied and by which they may be held securely.

This specification is the disclosure of one form of the invention, while the claim defines the actual scope thereof.

Reference is to be had to the accompanying drawings, forming a part of this specification, in which similar characters of reference indicate corresponding parts in all the views.

Figure 1 is a sectional view of the invention. Fig. 2 is a cross-section on the line 2 2 of Fig. 1. Fig. 3 is a cross-section on the line 3 3 of Fig. 1. Fig. 4 is a perspective view of one of the jaws, and Fig. 5 is a similar view of the other jaw.

The device comprises a shell or handle proper, $a$, which is tubular in form and which receives the jaws $b$ and $c$. These jaws are approximately semicircular in form, so as to match with each other and fit snugly against the tapering interior walls of the casing or shell $a$, the jaws being also tapered to conform thereto, as illustrated. If desired, the opposing faces of the jaws may be provided with yielding linings $d$, as shown best in Figs. 1 and 3, so that the jaws will effectively grip the shank of the tool. By forcing the tapering jaws into the tapering shell the jaws will be moved together and will thereupon grip and hold the shank of the tool. The tool may be released by moving the jaws outward from the casing.

The jaw $b$ is provided at its upper end with a round bar $b'$, forming a shank which receives an eye $c'$ on the jaw $c$, whereby to connect the two jaws together, the jaws being held rigid by a pin $e$, passing through the shank $b'$. The upper end of the shank $b'$ is screw-threaded and is adapted to be screwed into an interiorly-threaded opening in the upper end of the shell $a$.

In using the device the jaws are inserted into the shell $a$ and the shank $b'$ is engaged with the upper end of the shell. The tool is then inserted between the jaws and the jaws are turned around inside of the shell, so as to screw the shank $b'$ into the opening in the upper end of the shell, thus drawing the jaws upward and engaging their inclined outer surfaces with the inner surface of the shell and forcing the jaws together against the tool. The jaws are disengaged by a reversal of the above-described operation. If desired, an expansive spring $f$ may be inserted between the jaws $c$ and $b$ to hold them apart so long as the force of the spring is not overcome by the superior force of the screwing movement imparted to the jaws to tighten them.

Having thus described my invention, I claim as new and desire to secure by Letters Patent—

A tool-handle, comprising a shell or handle proper, and two jaws fitted therein, the jaws being tapered and the inner walls of the shell being correspondingly formed for the purpose specified, and one of the jaws having a threaded shank at its upper end over which is passed an eye formed on the other jaw so that the jaws may be connected with each other, the threaded shank of the first-named jaw screwing into the upper end of the shell or handle proper.

In testimony whereof I have signed my name to this specification in the presence of two subscribing witnesses.

JOHN CALVIN LAMBERT.

Witnesses:
GEO. D. HILTABRAND,
WINFIELD J. EBNER.